(12) United States Patent
Ying et al.

(10) Patent No.: US 7,049,712 B2
(45) Date of Patent: May 23, 2006

(54) PRIMARY SIDE ZVS PUSH-PULL CONVERTER HAVING RELATIVELY LESS LOSSES

(75) Inventors: Jianping Ying, Taoyuan Shien (TW); Hua Lin, Taoyuan Shien (TW); Qiuhua Zhu, Taoyuan Shien (TW); Wen-Yin Tsai, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 112 days.

(21) Appl. No.: 10/901,573

(22) Filed: Jul. 29, 2004

(65) Prior Publication Data
US 2005/0024901 A1 Feb. 3, 2005

(30) Foreign Application Priority Data
Jul. 30, 2003 (TW) .............................. 92120923 A

(51) Int. Cl.
*H02J 7/00* (2006.01)
(52) U.S. Cl. ........................................................ 307/66
(58) Field of Classification Search ................. 307/66, 307/64; 363/25, 26
See application file for complete search history.

(56) References Cited

U.S. PATENT DOCUMENTS
5,790,391 A * 8/1998 Stich et al. .................... 363/24

* cited by examiner

*Primary Examiner*—Shawn Riley
(74) *Attorney, Agent, or Firm*—Volpe and Koenig, P.C.

(57) ABSTRACT

The push-pull converter for zero-voltage switching of the switches on the primary side of the transformer to have a relatively lower loss is proposed. Which includes: a transformer having a primary winding with a center tap and a secondary winding, an electrical energy storage device having a first terminal coupled to the center tap of the primary winding and a second terminal coupled to a ground, a first switch having a first terminal coupled to a first terminal of the primary winding and a second terminal coupled to the ground, a second switch having a first terminal coupled to the ground and a second terminal coupled to a second terminal of the primary winding, and a rectifier circuit coupled to the secondary winding for transforming an AC output of the secondary winding to a DC output.

15 Claims, 9 Drawing Sheets

PRIMARY SIDE ZVS PUSH-PULL CONVERTER HAVING RELATIVELY LESS LOSSES

FIELD OF THE INVENTION

The present invention relates to the improvements of the push-pull converter. More specifically, this invention relates to the push-pull converter having primary side switches for zero-voltage switching (ZVS) so as to decrease the losses and to improve the efficiency.

BACKGROUND OF THE INVENTION

For the on-line uninterruptible power supply (UPS) systems, there are in general three working modes: the on-line mode, the battery mode, and the bypass mode. In the dual-mode, a power supply is offered to the load by a battery and through a DC—DC converter and an inverter. Usually, the DC voltage values offered by the battery are transformed and boosted to the DC voltage values required by the DC Bus through the DC—DC converter, and the DC voltage values of the DC Bus are transformed to the AC voltage outputs through the inverter.

Limited by the voltage values of the single battery, the battery set of the UPS system is usually composed by series connected batteries. For achieving a higher reliability of the system, the number of batteries coupled in series is relatively less so as to have the relatively lower output voltage values of the battery set. Compared with the converters having the half-bridge and the full-bridge configurations, the push-pull converters have the relatively lower conducting losses so as to be employed frequently in those UPS systems having the medium or low power values.

To increase the power densities of the UPS systems, having the relatively higher working frequencies of the power supply system is a necessary choice. To let the switches of the power system work in a relatively higher switching frequencies, the losses of the switches must be decreased. Since the capability of a battery to supply the electrical power is limited, thus the requirements regarding the efficiencies of the systems are relatively higher. Base on the above-mentioned reasons, researches regarding the soft-switching circuits are becoming more and more important.

In the prior arts, there are three methods for soft-switching the push-pull converters, and the circuit configurations of which are described as follows:

1. ZVS Push-Pull Converters

Please refer to FIG. 1, it shows the schematic circuit diagram of a ZVS push-pull converter having secondary side synchronous rectifier circuit. The exciting current of the transformer, the proper arrangement of the main switches on the primary side of the transformer, and the driving signals of the synchronous rectifier circuit on the secondary side are employed to accomplish the zero-voltage switching of all the switches in this circuit.

The advantages of this ZVS push-pull converter are that there is no special requirement regarding the duty ratios and this circuit can be employed in a pulse width modulation (PWM) mode operation. But, the number of switches is increased and the control of the circuit is relatively more complex. Thus, this circuit is not desirable for the cost-concerned applications.

2. ZVS LCL-Resonant Push-Pull Converters

Please refer to FIG. 2, it shows the schematic circuit diagram of a LCL-resonant push-pull converter. In the "LCL", the first L (as L1 in FIG. 2) indicates the leakage inductance limited to the secondary side of the transformer. The unique features of this circuit include that the CL unit is located after the rectifier diodes, and the frequency of the resonant angle of the LCL resonant circuit is:

$$\omega = \sqrt{\frac{L_1 + L}{L_1 LC}}.$$

Due to the applications of the exciting current of the transformer and the buffing of the drain-source capacitance of the switches, the switches at the primary side of the transformer could be operated under the zero-voltage switching status. And the resonant capacitor can be employed to snub the reverse recovery of the diode.

Although this kind of ZVS push-pull converters can be employed to accomplish the ZVS of the main switches, but the requirements regarding the duty ratios of these converters are relatively more rigid so as to desire the fix-frequency open-loop control having relatively larger duty ratios and a pre-determined resonant frequency twice the switching frequency. If these two conditions are not fulfilled, the effectiveness of the resonance will be influenced dramatically. Besides, there are tradeoffs regarding the choosing of the CL elements of these converters even though the switching frequency and the leakage inductance are given. If the capacitance values of the C element are relatively higher, the voltage ripples on the resonant capacitor and the voltage stresses on the output rectifier diodes are relatively lower, but the current ripples on the C and L elements are relatively higher. On the contrary, choosing relatively higher inductance values of the L element would generate the opposite results. Furthermore, the properly choosing of the depth of the resonance is relatively important. Otherwise, the conduction losses could be relatively higher even though the turn-off losses would be relatively lower. Since the resonant currents flow through the load, the ripples of the output voltages of this circuit are relatively hard to control.

3. ZVCS LC Resonant Push-Pull Converters

Please refer to FIG. 3, it shows the schematic circuit diagram of a ZVCS LC resonant push-pull converter. In its' resonant circuit, the L represents the leakage inductance counted on the secondary side of the transformer. The driving signals of the main switches are the fix-frequency pulses having the duty ratios slightly less than 0.5. The quality factors of the resonant circuit should be lower enough to let the resonant current $i_R$ operate under the discontinuous conduction mode.

The exciting current of the transformer and the drain-source capacitance of the switches are employed to accomplish the zero-voltage turn-on of the main switches of the primary side of the transformer, and the zero resonant current $i_r$ of the LC resonant circuit of the secondary side of the transformer is employed to accomplish the zero-current turn-off of the main switches.

These converters are different from the ZVS LCL resonant push-pull converters. Due to most of the resonant currents flow through the output capacitor, it is relatively easy to control the ripples of the output voltage of this circuit. But, the properly choosing of the depth of the resonance of these converters is relatively important. Otherwise, the conduction losses could be relatively higher.

Keeping the drawbacks of the prior arts in mind, and employing experiments and research full-heartily and persistently, the primary side ZVS push-pull converter having relatively less losses is finally conceived by the applicants.

SUMMARY OF THE INVENTION

It is therefore an object of the present invention to propose a push-pull converter having primary side switches for zero-voltage switching so as to decrease the switching losses of the circuit and to improve the efficiency of the UPS system.

According to the first aspect of the present invention, a zero-voltage switching push-pull converter includes: a transformer having a primary winding with a center tap and a secondary winding, an electrical energy storage device having a first terminal coupled to the center tap of the primary winding and a second terminal coupled to a ground, a first main switch having a first terminal coupled to a first terminal of the primary winding and a second terminal coupled to the ground, a second main switch having a first terminal coupled to the ground and a second terminal coupled to a second terminal of the primary winding, and a rectifier circuit coupled to the secondary winding for transforming an AC output of the secondary winding to a DC output, wherein an exciting current of the transformer is employed to accomplish a zero-voltage switching of the first and the second main switches.

Preferably, the electrical energy storage device is a battery.

Preferably, the first and the second main switches respectively have a parasite capacitor and a reverse-parallel connected diode.

Preferably, the primary winding with the center tap includes two windings both having an equal number of turns.

Preferably, the secondary winding further includes a center tap and the secondary winding with the center tap has two windings both having an equal number of turns.

Preferably, the rectifier circuit is a bridge rectifier circuit, and the rectifier circuit and the center tap of the secondary winding form a positive and a negative DC bus voltage outputs respectively.

Preferably, the bridge rectifier circuit includes two half-wave rectifier circuits.

Preferably, the rectifier circuit is a half-wave rectifier circuit to transform the AC output to the DC output.

Preferably, the leaking inductance between the primary winding and the secondary winding of the transformer is relatively larger and the two windings of the primary winding are coupled to each other relatively good.

Preferably, the rectifier circuit is a single-phase bridge rectifier circuit.

Preferably, the rectifier circuit is a double-current rectifier circuit.

According to the second aspect of the present invention, a zero-voltage switching method for a power supply apparatus, in which the apparatus includes a primary winding having a center tap, a secondary winding, a battery having a first terminal coupled to the center tap of the primary winding, two main switches coupled to the primary winding, and a rectifier circuit coupled to the secondary winding for transforming an AC output offered by the secondary winding to a DC output, includes the step of: employing an exciting current of the transformer to accomplish a zero-voltage switching of the two main switches of the apparatus.

Preferably, the power supply apparatus is a push-pull converter.

According to the third aspect of the present invention, a method for controlling a zero-voltage switching push-pull converter, in which the converter having a transformer is applied to a UPS system having an electrical energy storage device for offering a power supply and having a followed power-level changing, includes the steps of: operating the converter under a certain duty ratio when the converter has a relatively heavy load such that an exciting current of the transformer is employed to accomplish a primary side zero-voltage switching of the transformer; operating the converter under a PWM mode when the converter has a relatively light load and the electrical energy storage device is at a relatively prior stage of discharging; and operating the converter under the certain duty ratio when the converter has a relatively light load and the electrical energy storage device is at a relatively late stage of discharging such that an exciting current of the transformer is employed to accomplish a primary side zero-voltage switching of the transformer.

Preferably, the electrical energy storage device is a battery.

The present invention may best be understood through the following descriptions with reference to the accompanying drawings, in which:

DETAILED DESCRIPTION OF THE PREFERRED EMBODIMENT

After studying the discharging features of the batteries, a unique set of operational modes especially suitable for the DC—DC converter in the UPS system is elaborated in the present invention firstly. According to these operational modes, a method is proposed, in which the exciting current of the transformer is employed to accomplish the zero-voltage switching of the switches at the primary side of the push-pull converter when the UPS system has a relatively heavy load or the UPS system has a light load but the battery is at the late stage of the discharge, to decrease the switching losses of the proposed ZVS push-pull converter and to increase the efficiency of the UPS system relatively.

Figure 1:
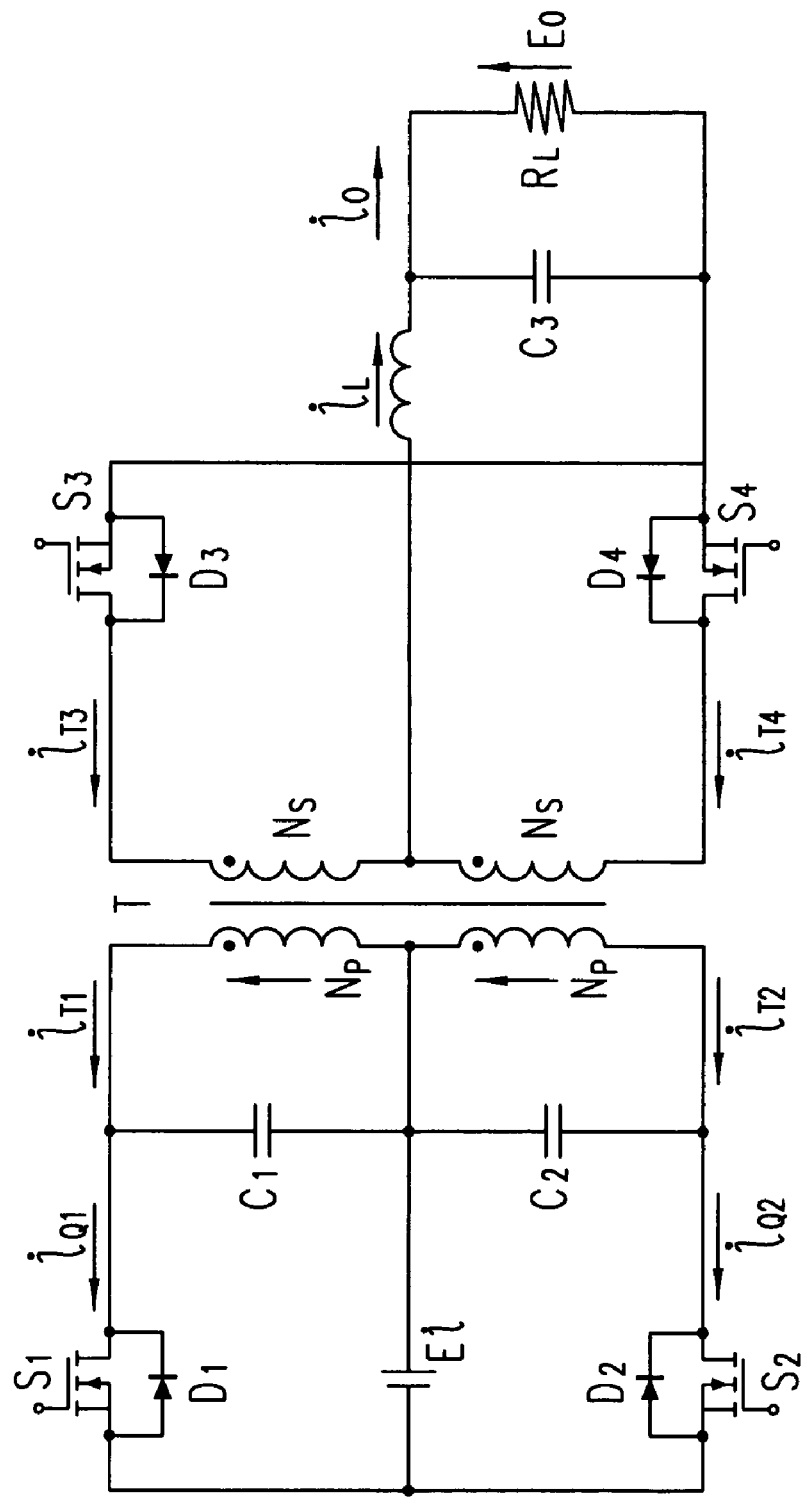
FIG. 1 is the schematic circuit diagram of a ZVS push-pull converter having secondary side synchronous rectifier in the prior art.
Figure 2:
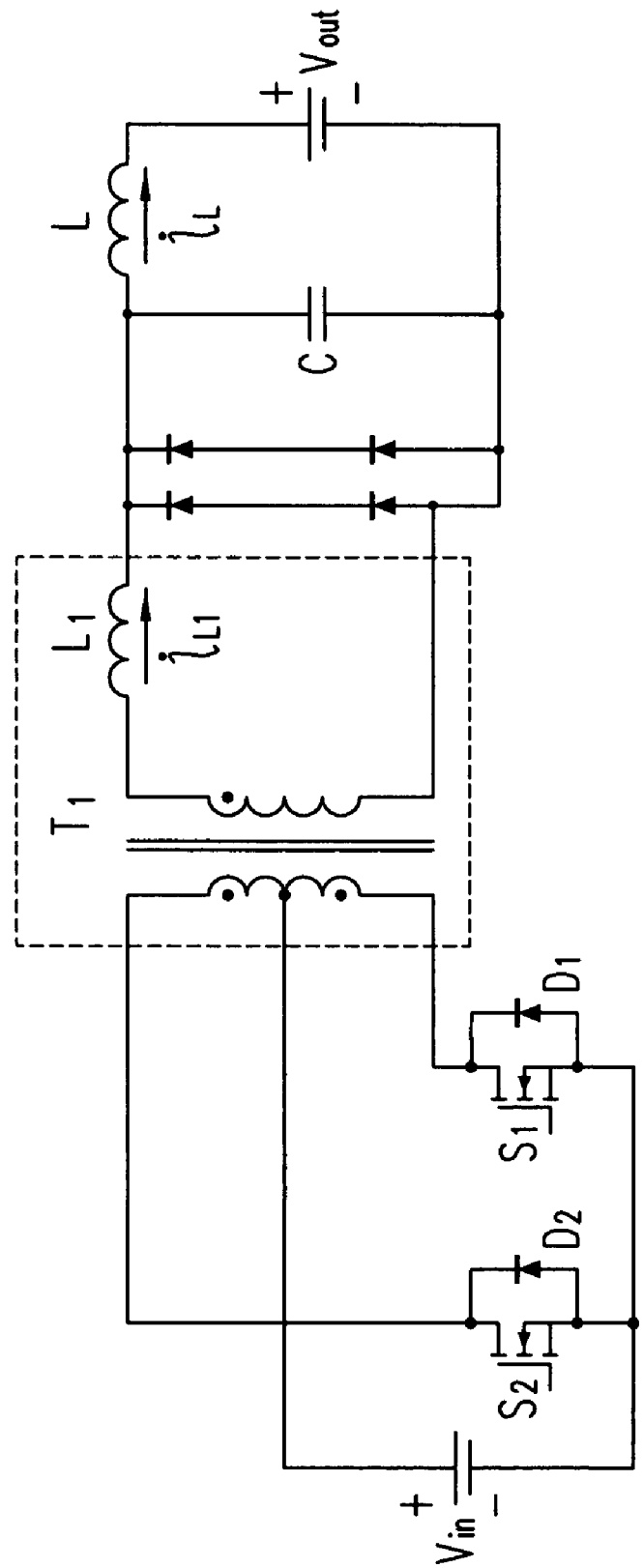
FIG. 2 is the schematic circuit diagram of a ZVS-LCL resonant push-pull converter in the prior art.
Figure 3:
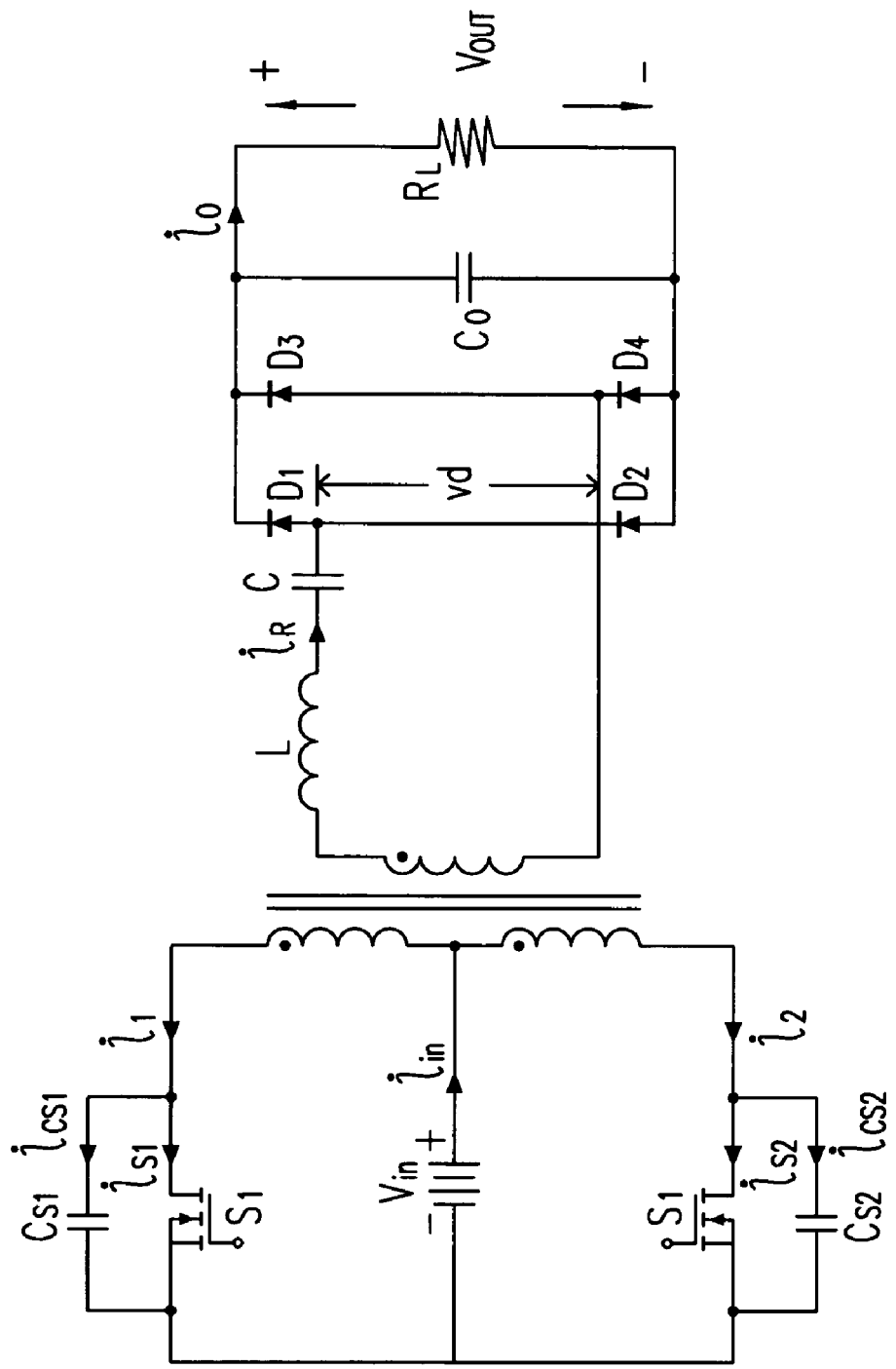
FIG. 3 is the schematic circuit diagram of a ZVCS LC resonant push-pull converter in the prior art.
Figure 4:
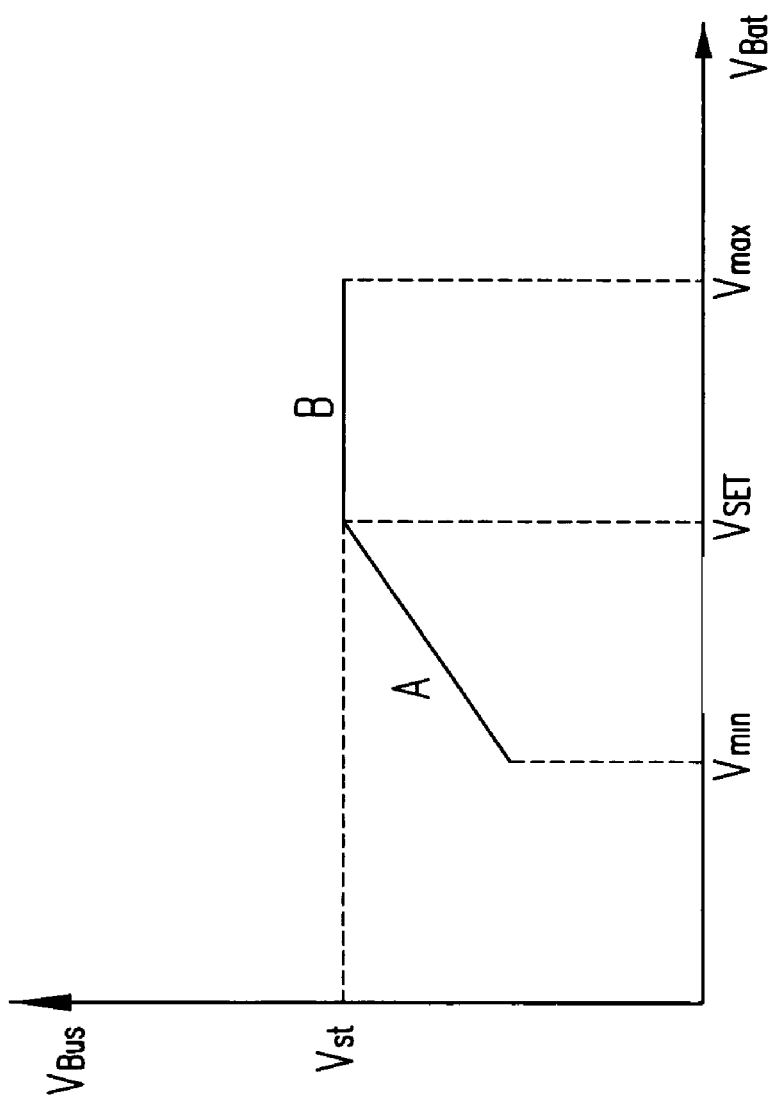
FIG. 4 shows the operational modes of the DC—DC converter in the UPS system.

For a DC—DC converter disposed on the UPS system, the voltage regulation of its' outputs within certain range is not necessary since the output voltage regulation of the UPS system could be guaranteed by the inverter in the second stage circuit. According to this concept, a unique set of operational modes of the DC—DC converter disposed on the UPS system is elaborated as follows:

1. When the input voltage is lower than a certain value ($V_{SET}$), the UPS system is operated under the fix-duty ratio mode, the duty ratio is fixed at a relatively higher value (approximately 0.5), and the output voltage becomes higher following the increasing of the input voltage.
2. When the input voltage is higher than a certain value ($V_{SET}$), the UPS system is operated under the PWM voltage-regulating mode and the output voltage is fixed at a pre-determined value ($V_{ST}$). The aforementioned operational modes of the DC—DC converter disposed on the UPS system are shown in FIG. 4. In which, "A" indicates the fix-duty ratio mode, and "B" indicates the PWM voltage-regulating mode.

Knowing from observing the discharging curve of the battery, if the discharging rate of the battery is relatively lower, the output voltages of the battery could be maintained at a relatively higher value for a relatively longer period during the prior stage of the discharging, and the output voltage of the battery dropped quickly at the late stage of the discharging. However, if the discharging rate of the battery is relatively higher even just for a relatively short period, the output voltage of the battery would drop quickly at the late stage of the discharging, although the output voltage of the battery is maintained at a relatively lower value during the prior stage of the discharging. During the prior stage of the battery discharging, if the UPS system has a relatively heavy load, the discharging rate of the battery is relatively higher, and the output voltages of the battery would be kept at a relatively lower level. If the UPS system has a relatively light load, the discharging rate of the battery is relatively lower, and the output voltages of the battery would be kept at a relatively higher level. During the late stage of the battery discharging, no matter the UPS system has a relatively heavy or light load, the output voltages of the battery would be kept at a relatively lower level. Combining the above observations with the special operational mode of the DC—DC converter disposed on the UPS system, the following corresponding relationships are found: 1. If the UPS system has a relatively heavy lord or the UPS system has a relatively light load and the battery is at the late stage of the discharging, the DC—DC converter is operated under the fix-duty ratio mode, which corresponds to the "A" stage of FIG. 4 (the duty ratio is approximately 0.5); 2. If the UPS system has a relatively light load and the battery is at the prior stage of the discharging, the DC—DC converter is operated under the PWM voltage-regulating mode, which corresponds to the "B" stage of FIG. 4.

Figure 5:
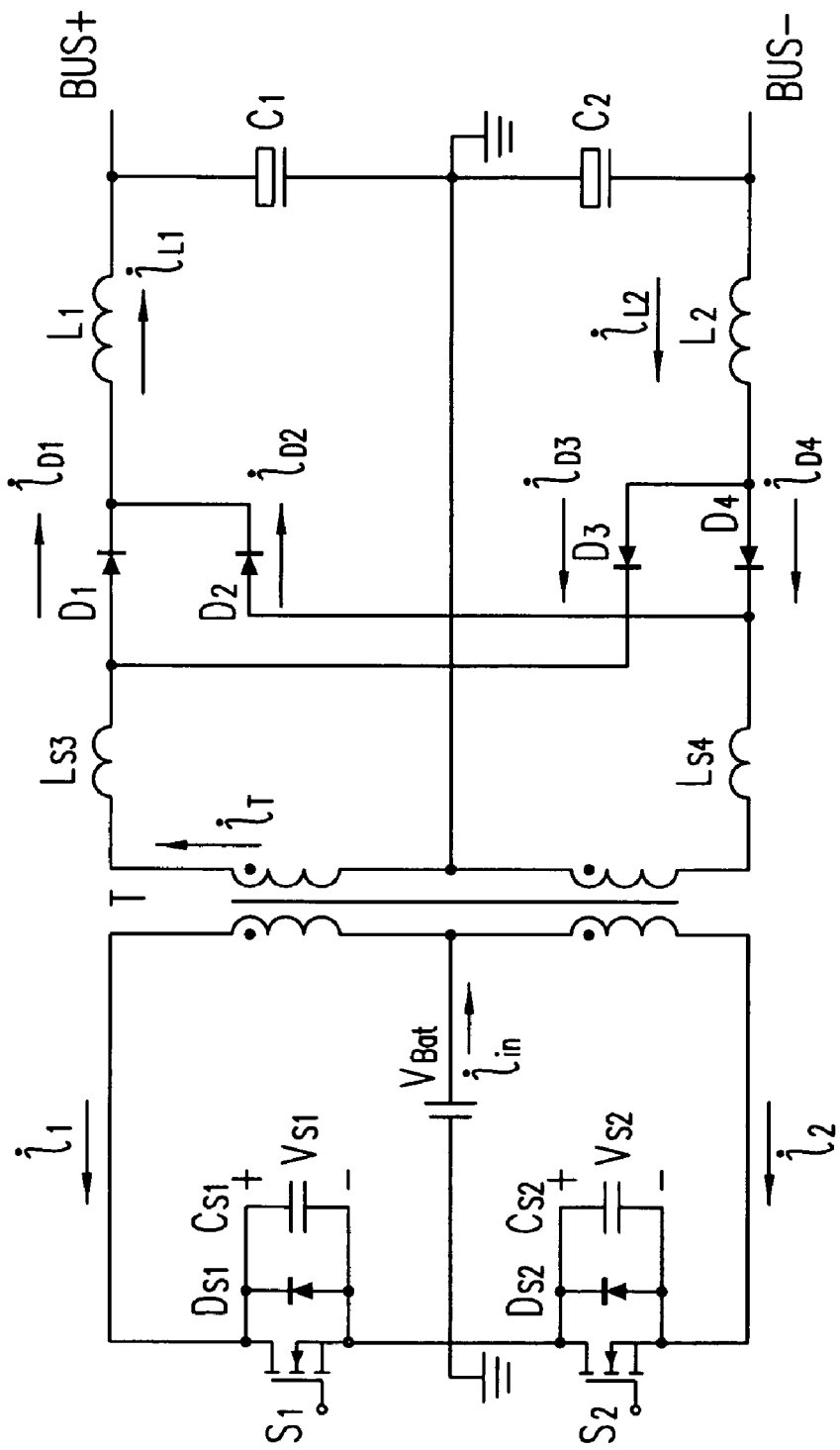
FIG. 5 is the schematic circuit diagram of the first preferred embodiment of the present invention.

Please refer to FIG. 5, which is the schematic circuit diagram of the first preferred embodiment of the proposed ZVS push-pull converter of the present invention. In which, $C_{s1}$, $C_{s2}$, $D_{s1}$, and $D_{s2}$ could be one of the parasite capacitors and diodes of the switches $S_1$ and $S_2$ respectively, external components, and the combinations of the above two. In FIG. 5, $L_{s3}$ and $L_{s4}$ are desired to have certain inductances respectively, and which could be achieved by the combination of the inductances of the external inductors and the leakage inductance between the primary and the secondary windings of the transformer. To decrease the amount of the magnetic elements in the real DC—DC converter, if the leakage inductance value between the primary and the secondary windings of the transformer is relatively higher enough, the above-mentioned external inductors could be omitted which could be accomplished by improving the design of the transformer. While the transformer is manufactured, the relatively good coupling between the two windings of the primary side could be achieved by winding the two windings synchronously, and the coupling between the primary and the secondary windings of the transformer could become relatively worse by increasing an extra magnetic path in the transformer purposely to achieve the goal of increasing the leakage inductance.

Figure 6:
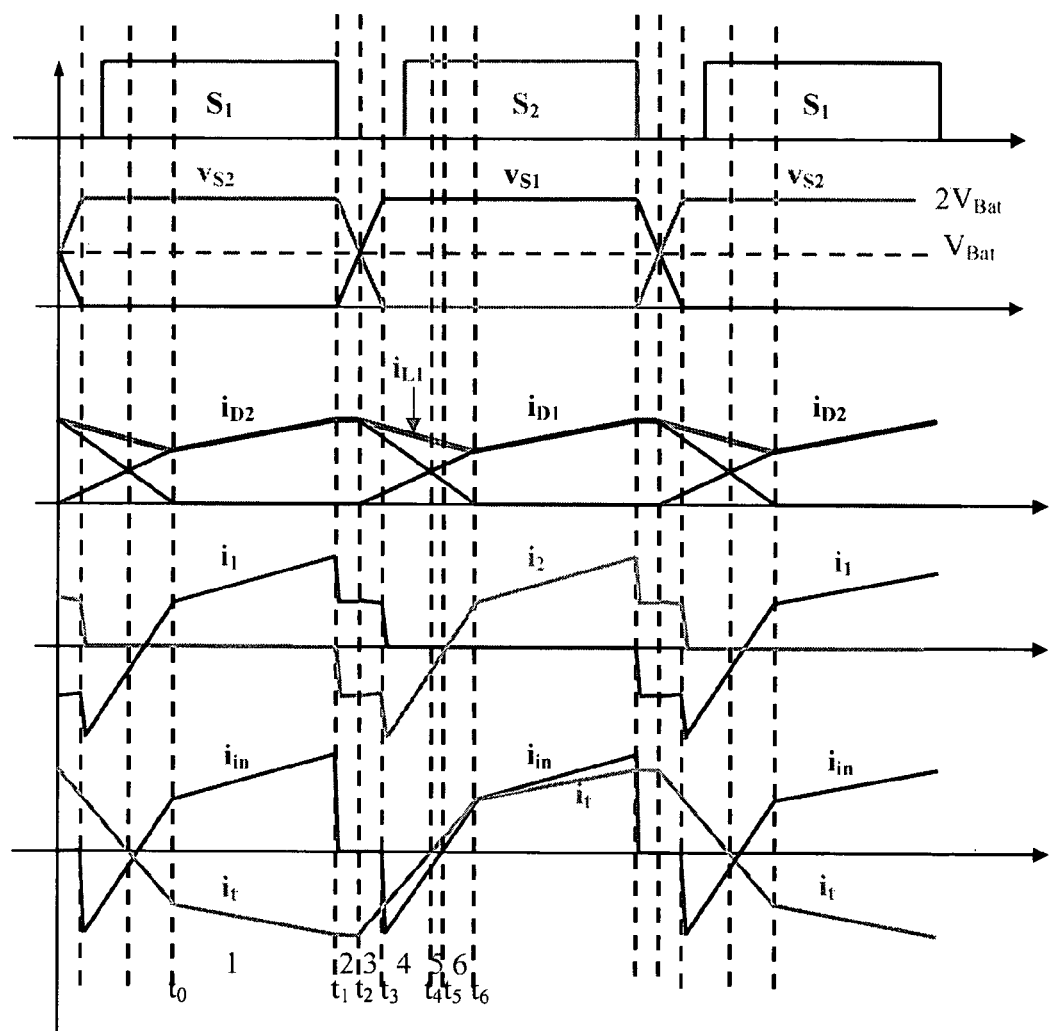
FIG. 6 is the waveforms versus time periods diagram, which shows the operational modes of the first preferred embodiment of the present invention.

Please refer to FIG. 6, which shows the waveforms versus time periods diagram of the aforementioned operational modes according to the first preferred embodiment of the present invention. In which, the symbols represent the same meanings and reference directions as those shown in FIG. 5. Assume that the load of the DC—DC converter is relatively heavy, the converter is operated under the fix-duty ratio mode and the duty ratio is approximately 0.5. Each switching cycle of the DC—DC converter could be divided into twelve operational stages. The last six stages are totally symmetrical to the first six stages. Therefore, only the first six stages are briefly analyzed as follows.

Stage 1 ($t_0 \sim t_1$): The main switch $S_1$ is turned on, and the electrical power is supplied from the power source to the load. The diodes $D_2$ and $D_3$ are conductive, $i_1 = i_{in}$, and $i_{L1} = i_{L2} = i_{D2} = i_{D3} = -i_T$.

Stage 2 ($t_1 \sim t_2$): At the moment of $t_1$, the main switch $S_1$ is turned off. Since the coupling between the two windings of the primary side is relatively good, the current of the primary side of the transformer becomes to flow through the two windings simultaneously instead of only one winding, $i_2 = -i_1$, and $i_{in} = 0$. Affected by both the exciting current of the transformer and the current on the load, the capacitor $C_{S1}$ begins to be charged, and the value of $v_{S1}$ begins to increase from zero. Meanwhile, the capacitor $C_{S2}$ begins to discharge, and the value of $v_{S2}$ begins to decrease from twice that of the battery voltage ($2V_{Bat}$). Due to the time constant has a relatively higher value and the time period is relatively short in this stage, we could assume that the $i_{L1}$, $i_{D2}$, and $i_T$ are kept unchanged basically. At the moment of $t_2$, $v_{S1} = v_{S2} = V_{Bat}$, and the voltage drop on the windings of the transformer is zero. Meanwhile, the diodes $D_1$ and $D_4$ become conductive. If the values of $L_{S3}$ and $L_{S4}$ are relatively small, and could be totally neglected, then the windings of the secondary side of the transformer are short-circuited and the voltage drop on the windings of the secondary side of the transformer is clamped at the zero volts. The conditions that $v_{S1} = v_{S2} = V_{Bat}$ are kept unchanged until the trigging pulse signal of $S_2$ is available, thus the switch $S_2$ could not be turned on under such a circumstances. If the leakage inductance of the transformer becomes large enough, the proposed converter circuit would go into stage 3.

Stage 3 ($t_2 \sim t_3$): At the moment of $t_2$, $v_{S1} = v_{S2} = V_{Bat}$, and the voltage drop on the windings of the transformer is zero, the diodes $D_1$ and $D_4$ become conductive, $i_{D2}$ and $i_{D3}$ begin to decrease slowly, $i_{D1}$ and $i_{D4}$ begin to increase slowly, $i_{L1} = i_{D1} + i_{D2}$, $i_T = i_{D1} - i_{D3} (= i_{D1} - i_{D2})$, and $i_T$ is still smaller than zero. Since $L_{S3}$ and $L_{S4}$ have certain inductance values, the secondary side of the transformer would not be short-circuited because of the two diodes $D_1$ and $D_4$ become conductive simultaneously. Meanwhile, the capacitor $C_{S1}$ continues to be charged, and the capacitor $C_{S2}$ continues to discharge. Since the load current count on the primary side of the transformer has the decreasing trend, the rates of change of the voltages across capacitors $C_{S1}$ and $C_{S2}$ are decreased respectively. At the moment of $t_3$, $v_{S1}=2V_{Bat}$, and $v_{S2}=0$.

Stage 4 ($t_3 \sim t_4$): At the moment of t3, $v_{S2}=0$, the diode $D_{S2}$ becomes conductive, and the condition for the zero-voltage turning on of the switch $S_2$ is created. During this period, $i_{D2}$ and $i_{D3}$ are decreased continuously, and $i_{D1}$ and $i_{D4}$ are increased continuously. At the moment of $t_4$, $i_{D1}=i_{D2}=i_{D3}=i_{D4}$, and $i_T=0$.

Stage 5 ($t_4 \sim t_5$): At the moment of $t_4$, all the currents, which flow through the rectifier diodes on the secondary side, are equivalent. After that, $i_T=i_{D1}-i_{D2}>0$, and the direction of the current on the secondary side of the transformer is changed. At the moment of $t_5$, the diode $D_{S2}$ is turned off by zero current.

Stage 6 ($t_5 \sim t_6$): The main switch $S_2$ is turned on under zero voltage. During this period, $i_{D2}$ and $i_{D3}$ are decreased continuously, and $i_{D1}$ and $i_{D4}$ are increased continuously. At the moment of $t_6$, $i_{L1}=i_{L2}=i_{D1}=i_{D4}=i_T$, and $i_{D2}=i_{D3}=0$.

After the moment of $t_6$, the electrical power is supplied from the power source to the load, and the second half switching cycle of the DC—DC converter begins. Since the last six stages are totally symmetrical to the first six stages, which are skipped for the time being.

The aforementioned operational procedures are acquired under the circumstances that the proposed DC—DC converter is operated while the UPS system has a relatively heavy load. If the UPS system has a relatively light load and the battery is at the relatively late stage of the discharging, the output voltage value of the battery would be relatively lower, DC—DC converter is operated under the fix-duty ratio mode, the duty ratio is approximately 0.5, and the zero-voltage switching of the switches on the primary side of the proposed push-pull converter could also be accomplished. If the UPS system has a relatively light load and the battery is at the relatively prior stage of the discharging, the output voltage value of the battery would be relatively higher, DC—DC converter is operated under the PWM voltage-regulating mode, and the duty ratio is apparently smaller. When the proposed push-pull converter is operated at the moment of $t_5$, the driving pulse of the switch $S_2$ is not sent out yet due to the duty ratio of the proposed push-pull converter is relatively lower, thus the current would flow through $C_{S2}$ again and make the voltage across the two terminals of switch $S_2$ begin to rise. By the same token, the current would flow through $C_{S1}$ again and make the voltage across the two terminals of switch $S_1$ begin to drop from $2V_{Bat}$, thus the oscillations would be generated in the loop such that the switch $S_2$ does not have the proper conditions for the zero-voltage switching any more. But due to the UPS system has a relatively light load, the proposed push-pull converter would have a relatively less losses firstly. Besides, the battery is at the relatively prior stage of the discharging such that the operational time of the proposed push-pull converter is relatively short secondly. Thus, the above-mentioned situation will not cause too much concerns regarding the heat-dissipating design of the UPS system.

Figure 7:
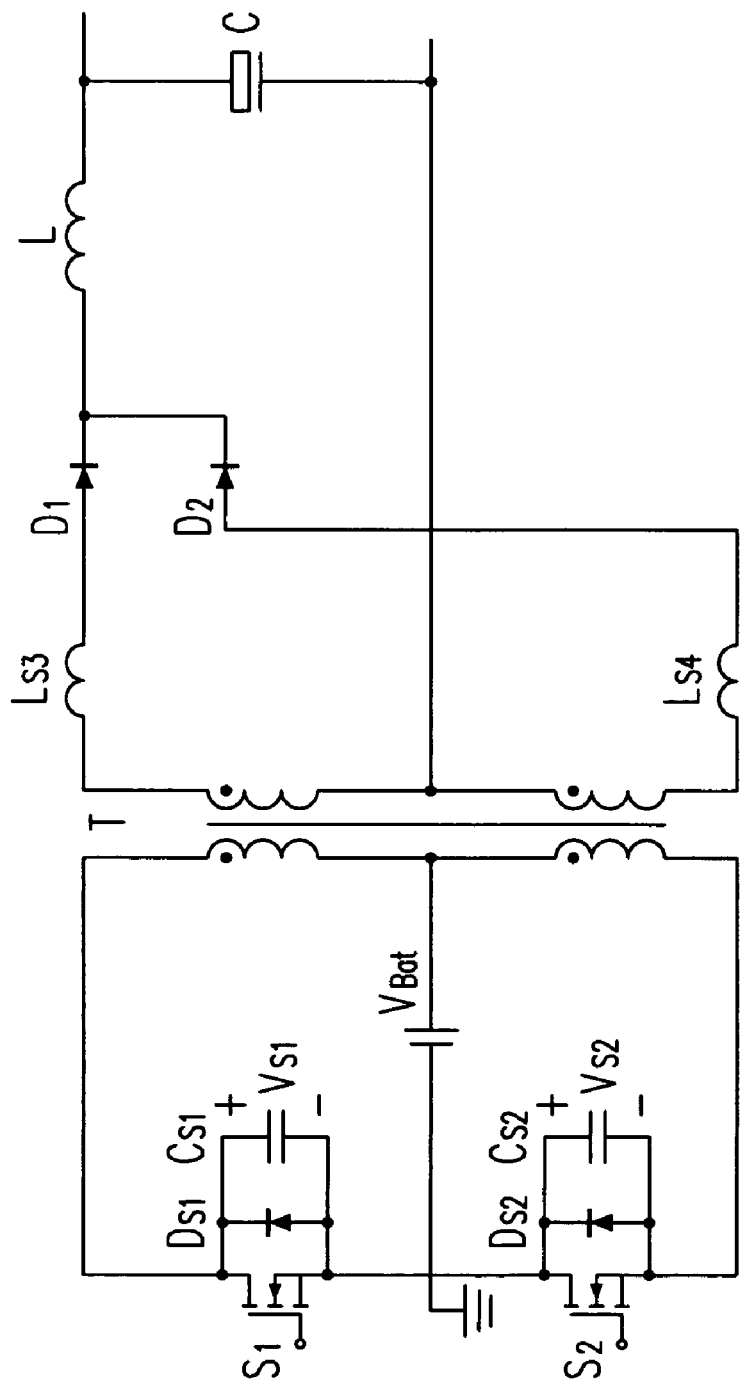
FIG. 7 is the schematic circuit diagram of the second preferred embodiment of the present invention.

As shown in FIG. 5, the proposed push-pull converter is applicable to the DC—DC converter of the UPS system. The outputs of the proposed push-pull converter are coupled to the positive and negative DC buses respectively. Besides, there are center-tapped windings respectively composed of two windings both having an equal number of turns on the primary and the secondary sides of the transformer. Furthermore, a single-phase bridge rectifier circuit (which could be decomposed as two half-wave rectifier circuits) is coupled to the secondary side of the transformer. Lastly, the output of the bridge rectifier circuit and the center tap of the secondary side are coupled to the positive and negative DC buses Please refer to FIG. 7, which shows the schematic circuit diagram of the second preferred embodiment of the present invention. The proposed circuit is also applicable to the DC—DC converter of the UPS system and the outputs of this ZVS push-pull converter are couple to a DC bus. Firstly, there are center-tapped windings respectively composed of two windings both having an equal number of turns on the primary and the secondary sides of the transformer too. Besides, there is a dual half-wave rectifier circuit coupled to the secondary side of the transformer. Lastly, the DC output of the rectifier circuit is coupled to the DC bus.

Figure 8:
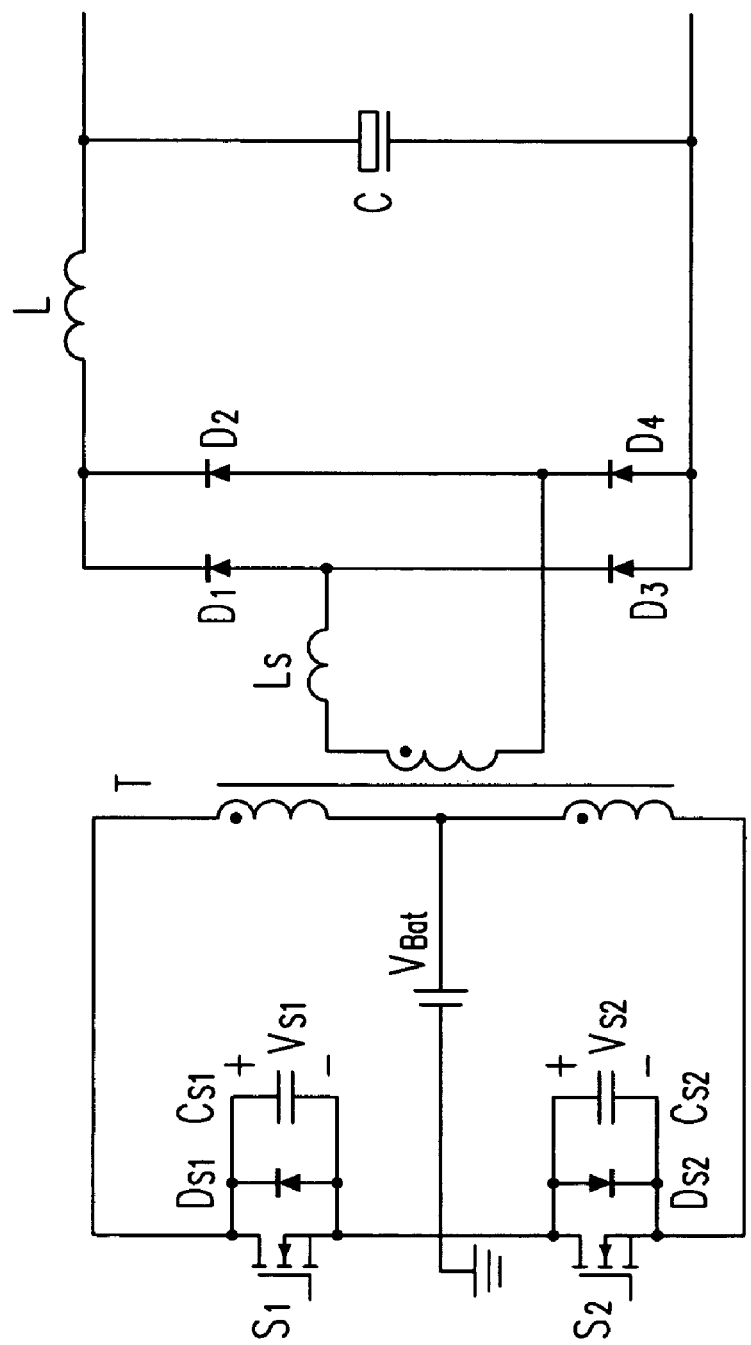
FIG. 8 is the schematic circuit diagram of the third preferred embodiment of the present invention.

Please refer to FIG. 8, which shows the schematic circuit diagram of the third preferred embodiment of the present invention. This circuit is applicable to the DC—DC converter of the UPS system and the output of the proposed ZVS push-pull converter is couple to a DC bus too. Besides, there are center-tapped winding composed of two windings both having an equal number of turns on the primary side and a single winding on the secondary side of the transformer respectively. Furthermore, there is a single-phased bridge rectifier circuit coupled to the secondary side of the transformer. Lastly, the DC output of the rectifier circuit is coupled to the DC bus.

Figure 9:
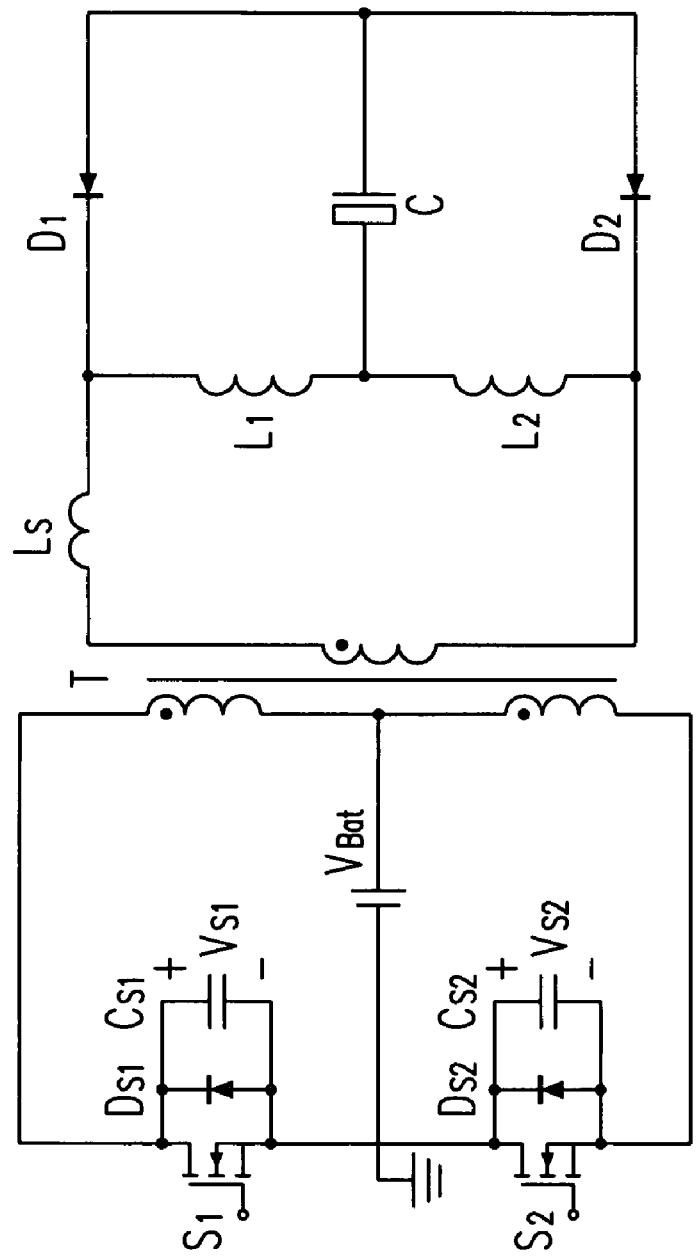
FIG. 9 is the schematic circuit diagram of the fourth preferred embodiment of the present invention.

Please refer to FIG. 9, which shows the schematic circuit diagram of the fourth preferred embodiment of the present invention. Again, the proposed circuit is applicable to the DC—DC converter of the UPS system and the output of this ZVS push-pull converter is couple to a DC bus. There are also center-tapped winding composed of two windings both having an equal number of turns on the primary side and a single winding on the secondary side of the transformer respectively. Besides, a double-current rectifier circuit is coupled to the secondary side of the transformer. Lastly, the DC output of the rectifier circuit is coupled to the DC bus.

In the battery mode of the UPS system, the exciting current of the transformer is employed in the proposed method to accomplish the zero-voltage switching of the switches at the primary side of the push-pull converter when the UPS system has a relatively heavy load or the UPS system has a relatively light load but the battery is at the relatively late stage of the discharging according to the aforementioned unique operational modes inspired by analyzing the discharging features of the batteries. The proposed ZVS push-pull converters are especially appropriate for applying to the circuits which are powered by the batteries and do not need the voltage regulation for their outputs within a certain range.

In conclusion, the proposed push-pull converters are applicable to the DC—DC converter of the UPS system employing the battery as the power supply and have the distinct advantages of relatively decreasing the switching losses of the circuit and increasing the efficiency of the UPS system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A zero-voltage switching push-pull converter, comprising:
 a transformer having a primary winding with a center tap and a secondary winding;
 an electrical energy storage device having a first terminal coupled to said center tap of said primary winding and a second terminal coupled to a ground;
 a first main switch having a first terminal coupled to a first terminal of said primary winding and a second terminal coupled to said ground;
 a second main switch having a first terminal coupled to said ground and a second terminal coupled to a second terminal of said primary winding; and
 a rectifier circuit coupled to said secondary winding for transforming an AC output of said secondary winding to a DC output,
wherein an exciting current of said transformer is employed to accomplish a zero-voltage switching of said first and said second main switches.

2. The converter according to claim 1, wherein said electrical energy storage device is a battery.

3. The converter according to claim 1, wherein said first and said second main switches respectively have a parasite capacitor and a reverse-parallel connected diode.

4. The converter according to claim 1, wherein said primary winding with said center tap comprises two windings both having an equal number of turns.

5. The converter according to claim 1, wherein said secondary winding further comprises a center tap and said secondary winding with said center tap has two windings both having an equal number of turns.

6. The converter according to claim 5, wherein said rectifier circuit is a bridge rectifier circuit, and said rectifier circuit and said center tap of said secondary winding form a positive and a negative DC bus voltage outputs respectively.

7. The converter according to claim 6, wherein said bridge rectifier circuit comprises two half-wave rectifier circuits.

8. The converter according to claim 5, wherein said rectifier circuit is a half-wave rectifier circuit to transform said AC output to said DC output.

9. The converter according to claim 1, wherein a leakage inductance between said primary winding and said secondary winding of said transformer is relatively larger and said two windings of said primary winding are coupled to each other relatively good.

10. The converter according to claim 1, wherein said rectifier circuit is a single-phased bridge rectifier circuit.

11. The converter according to claim 1, wherein said rectifier circuit is a double-current rectifier circuit.

12. A zero-voltage switching method for a power supply apparatus, wherein said apparatus comprises a primary winding having a center tap, a secondary winding, a battery having a first terminal coupled to said center tap of said primary winding, two main switches coupled to said primary winding, and a rectifier circuit coupled to said secondary winding for transforming an AC output offered by said secondary winding to a DC output, comprising the step of:
 employing an exciting current of said transformer to accomplish a zero-voltage switching of said two main switches of said apparatus.

13. The method according to claim 12, wherein said power supply apparatus is a push-pull converter.

14. A method for controlling a zero-voltage switching push-pull converter, wherein said converter having a transformer is applied to a UPS system having an electrical energy storage device for offering a power supply and having a followed power-level changing, comprising the steps of:
 operating said converter under a certain duty ratio when said converter has a relatively heavy load such that an exciting current of said transformer is employed to accomplish a primary side zero-voltage switching of said transformer;
 operating said converter under a PWM mode when said converter has a relatively light load and said electrical energy storage device is at a relatively prior stage of discharging; and
 operating said converter under said certain duty ratio when said converter has a relatively light load and said electrical energy storage device is at a relatively late stage of discharging such that an exciting current of said transformer is employed to accomplish a primary side zero-voltage switching of said transformer.

15. The method according to claim 14, wherein said electrical energy storage device is a battery.

* * * * *